No. 845,542. PATENTED FEB. 26, 1907.
G. W. GOODRIDGE.
INCANDESCENT LAMP SOCKET.
APPLICATION FILED MAY 17, 1906.
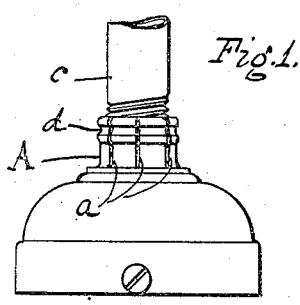
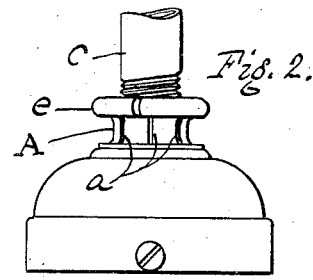
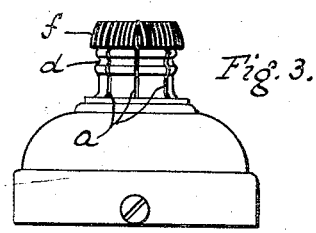
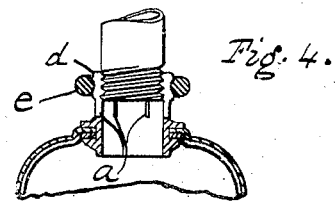
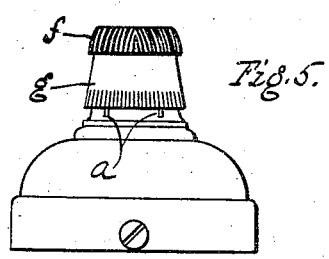
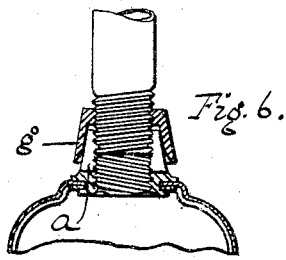
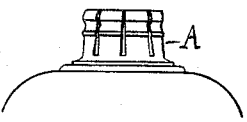
WITNESSES
William Abbe
E. U. Collins
INVENTOR
Gilbert W. Goodridge
BY
Howson and Howson
ATTORNEYS

UNITED STATES PATENT OFFICE.

GILBERT W. GOODRIDGE, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

INCANDESCENT-LAMP SOCKET.

No. 845,542.  Specification of Letters Patent.  Patented Feb. 26, 1907.

Application filed May 17, 1906. Serial No. 317,365.

*To all whom it may concern:*

Be it known that I, GILBERT W. GOODRIDGE, a citizen of the United States of America, residing in Bridgeport, in the county of Fairfield, State of Connecticut, have invented certain new and useful Improvements in Incandescent-Lamp Sockets and the Like, of which the following is a specification.

My invention relates to an improvement in incandescent-lamp sockets and the like.

The object of my invention is to provide a more satisfactory construction than heretofore employed for securing a pipe or bushing in the cap-nipple.

In the accompanying drawings, Figure 1 is a side elevation of a cap embodying my invention. Fig. 2 is a side elevation of the same, showing the additional feature of a binding-ring. Fig. 3 is a side elevation as in Fig. 1, adapted to receive a screw-bushing instead of a pipe. Fig. 4 is a sectional view of Fig. 2. Fig. 5 is a side view of the cap in another form. Fig. 6 is a cross-section of the same, and Fig. 7 is a side view of a cap without pipe or bushing.

Referring to the drawings, the nipple A of the cap is preferably first tapped to receive the threaded end of a pipe $c$ or a screw-bushing $f$. The nipple is then cut vertically in a series of radial slits $a$ and the fingers so formed conically compressed, as shown in Fig. 7, so as to render the mouth of the nipple of less diameter than that of the pipe or bushing which it is to receive. By so doing the fingers act as springs which press against the entered pipe or bushing and bind the same. My invention may be used in this form, as illustrated in Figs. 1 and 3, and is so preferred when, as in Fig 3, a composition bushing $f$ is used, since the pressure of a binding-ring such as is hereinafter described, like the pressure of the binding-screws now generally in use, frequently splits the bushing.

Where the cap is to receive the pipe, the nipple may be provided with an external annular groove $d$, into which fits a spring-ring $e$, which as the pipe enters effectually clutches or binds the fingers against the same. This result is attained still more effectually if the pipe or bushing tapers slightly in its threaded portion, thus acting as a wedge as it enters and is clamped by the binding-ring. For the spring-ring may be substituted a conical binding-ring $g$, as shown in Figs. 5 and 6, which is of sufficient thickness at its smaller end to permit of its being tapped to receive the pipe or bushing. When this conical ring is used, the nipple should not be provided with the annular groove. As the pipe or bushing enters, the fingers of the nipple are prevented from spreading by the conical ring, as in the case of the binding-ring first described.

I claim as my invention—

1. A cap for incandescent-lamp sockets and the like, having a slitted neck threaded on its inner face as and for the purpose described.

2. A cap for incandescent-lamp sockets and the like, having a slitted neck threaded on its inner face and means to prevent the segments of the neck from spreading.

3. A cap for incandescent-lamp sockets and the like, having a slitted neck threaded on its inner face, and provided on its outer face with a binding-ring.

4. A cap for incandescent-lamp sockets and the like, having a slitted neck threaded on its inner face and provided on its outer face with an annular groove, in combination with a binding-ring fitted therein.

5. A cap for incandescent-lamp sockets and the like, having a slitted neck threaded on its inner face and conically compressed as and for the purpose described.

In testimony whereof I have signed my name to this specification in the presence of two subscribing witnesses.

GILBERT W. GOODRIDGE.

Witnesses:
H. W. GOLDSBOROUGH,
F. E. SEELEY.